(12) United States Patent
Mauro et al.

(10) Patent No.: US 10,711,671 B2
(45) Date of Patent: Jul. 14, 2020

(54) METHOD, SYSTEM AND COMPUTER-PROGRAM PRODUCT FOR CONTROLLING THE PARTICULATE COMBUSTION DURING THE REGENERATION OF A PARTICULATE FILTER OF A DIESEL ENGINE

(71) Applicant: FCA Italy S.p.A., Turin (IT)

(72) Inventors: Alessandro Mauro, Turin (IT);
Vincenzo Colandrea, Turin (IT);
Danilo Garombo, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 16/133,913

(22) Filed: Sep. 18, 2018

(65) Prior Publication Data

US 2019/0085745 A1  Mar. 21, 2019

(30) Foreign Application Priority Data

Sep. 21, 2017 (EP) .................................. 17192415

(51) Int. Cl.
*F01N 3/02* (2006.01)
*F01N 3/023* (2006.01)
(Continued)

(52) U.S. Cl.
CPC ......... *F01N 3/0234* (2013.01); *F01N 3/0235* (2013.01); *F01N 9/002* (2013.01);
(Continued)

(58) Field of Classification Search
CPC ........ F01N 3/02; F01N 3/0234; F01N 3/0885; F02D 41/02; F02D 41/029; F02D 41/0295; F02D 41/0235
(Continued)

(56) References Cited

U.S. PATENT DOCUMENTS 6,952,918 B2 * 10/2005 Imai ........................ F01N 3/023
60/274
8,001,774 B2 * 8/2011 Onodera ............... F01N 3/0235
60/295

(Continued)

FOREIGN PATENT DOCUMENTS

EP  1203869 A1  5/2002
EP  1873369 A1  1/2008
(Continued)

OTHER PUBLICATIONS

European Search Report dated Mar. 16, 2018 for EP 17 19 2415. 10 pages.

*Primary Examiner* — John Kwon
*Assistant Examiner* — Johnny H Hoang
(74) *Attorney, Agent, or Firm* — RMCK Law Group, PLC

(57) ABSTRACT

A diesel engine system includes a diesel engine, an exhaust line, a particulate filter interposed in the exhaust line and an electronic control unit for controlling fuel injectors associated with cylinders of the engine. When an accumulated particulate mass in said filter reaches a predetermined threshold, a filter regeneration mode is activated, including activating post-injections of fuel by controlling said injectors, to determine a start of an automatic filter regeneration step, which is caused by an increase in temperature of exhaust gases fed to the filter. The temperature increase is sufficient to burn particulate in the filter. The post-injections of fuel are deactivated whenever a critical condition occurs for at least a first period of time, the critical condition being one in which a temperature value upstream of the filter exceeds a first threshold value. In this case, the regeneration mode is resumed following disappearance of the critical condition.

12 Claims, 4 Drawing Sheets

(51) Int. Cl.
*F02D 41/02* (2006.01)
*F01N 9/00* (2006.01)
*F02D 41/40* (2006.01)

(52) U.S. Cl.
CPC ....... *F02D 41/029* (2013.01); *F02D 41/0295* (2013.01); *F02D 41/405* (2013.01); *F01N 2430/085* (2013.01); *F01N 2560/06* (2013.01); *F01N 2560/14* (2013.01); *F01N 2900/0601* (2013.01); *F01N 2900/1602* (2013.01); *F01N 2900/1606* (2013.01); *F02D 2200/0802* (2013.01); *F02D 2200/0804* (2013.01); *F02D 2200/0812* (2013.01)

(58) Field of Classification Search
USPC ........... 701/103; 60/274, 276, 286, 300, 303
See application file for complete search history.

(56) References Cited

U.S. PATENT DOCUMENTS 8,459,010 B2 * 6/2013 Hancu ..................... F01N 3/025
                                                      60/274
2004/0035101 A1     2/2004  Imai et al.
2009/0320880 A1 * 12/2009  Hakansson ............ B01D 41/04
                                                      134/18
2010/0319324 A1 * 12/2010  Mital ..................... F01N 3/021
                                                      60/286
2015/0369154 A1 * 12/2015  Garombo ................ F01N 9/002
                                                      60/274
2016/0061085 A1 *  3/2016  Nagaoka ............... F01N 3/0814
                                                      60/274
2016/0069234 A1 *  3/2016  Yoshida ................ F01N 3/0814
                                                      60/286
2016/0153329 A1 *  6/2016  Kim ..................... F02D 41/029
                                                      60/274
2016/0201533 A1 *  7/2016  Upadhyay ............. F01N 3/0232
                                                      701/102

FOREIGN PATENT DOCUMENTS

EP        1980725 A1    10/2008
EP        2530264 A1    12/2012
FR        2841936 A1     1/2004
JP     2008106709 A      5/2008
WO     2016092481 A1     6/2016

* cited by examiner

METHOD, SYSTEM AND COMPUTER-PROGRAM PRODUCT FOR CONTROLLING THE PARTICULATE COMBUSTION DURING THE REGENERATION OF A PARTICULATE FILTER OF A DIESEL ENGINE

CROSS-REFERENCE TO RELATED APPLICATION

This application claims priority to European Patent Application No. 17 192 415.2 filed Sep. 21, 2017. The disclosure of the above application is incorporated herein by reference in its entirety.

FIELD OF THE INVENTION

The present invention relates to Diesel engines and in particular to a method for controlling regeneration of a particulate filter interposed along the exhaust line of a Diesel engine, by controlling a combustion process of the particulate present in the particulate filter.

PRIOR ART

Reducing particulate emissions from a Diesel engine is a key problem to meet current and future regulations relative to pollutant emissions. In order to comply with particulate emission limits, it is necessary to use exhaust gas treatment systems, particularly including a Diesel Particulate Filter (DPF) or trap, which acts as a mechanical barrier to prevent the passage of the particulate thanks to the conformation of the ceramic channels created inside it. The aforesaid trap is integrated into the exhaust line of the engine and is able to retain therein the particulate generated during the combustion process, with an efficiency close to 100%. Particulate accumulation on the filter surface does, however, increase the pressure at the exhaust of the engine, which causes a decrease in efficiency of the engine. Consequently, regeneration of the trap is periodically desired by means of the ("light off") combustion of the particulate accumulated therein. To this end, the engine electronic control unit (ECU) for controlling the fuel injectors associated with the cylinders of the engine is programmed to activate—when a quantity of particulate accumulated in the filter exceeding a threshold value is detected—an injector control mode, which results in an automatic regeneration of the filter by an increase in the temperature of the exhaust gases sent to the filter, sufficient to burn the particulate in the filter. This temperature increase is obtained, for example, by controlling multiple fuel injections in the combustion chamber during the exhaust step (post-injections) so as to introduce the partially combusted fuel directly into the exhaust line. This partially combusted fuel, burning along the exhaust line, induces high temperatures in the DPF, allowing combustion of the accumulated particulate mass.

FIG. 1 of the attached drawings schematically shows the injection control system and the exhaust system of a modern Diesel engine. In this figure, reference numeral 1 indicates the engine, having a plurality of cylinders, each provided with an electromagnetic fuel injector 2 controlled by an electronic control unit E. Reference numeral 4 indicates the intake duct of the air, in which a flowmeter 5, a butterfly valve 6, an exhaust gas recirculation (EGR) valve 7 and a supercharging compressor 8 are interposed. The reference numeral 9 indicates, as a whole, the exhaust line of the engine in which the turbine 10 is interposed, which is mechanically connected to the supercharging compressor 8, along with a pre-catalyst 11, the catalytic converter 12, and the Diesel particulate filter 13. The reference number 14 indicates the line for recirculating exhaust gases from the engine outlet to the EGR valve 7. A sensor 15 detects the existing pressure difference upstream and downstream of the particulate filter 13. The electronic control unit E receives signals leaving said sensor 15, from temperature sensors T5 and T6, associated with the exhaust gas treatment device, located upstream and downstream of the particulate filter 13, respectively, and from the flowmeter 5, and transmits control signals to the butterfly valve 6, to the EGR valve 7, and to the injectors 2. An example of such a system is EP 2963271 B1.

The engine electronic control unit E is able to activate an automatic regeneration mode of the filter, resulting in the start of a regeneration step of the filter, with the regeneration mode that controls multiple fuel injections at each cycle of the engine so as to temporarily adjust the temperature of the exhaust gases sent to the filter 13 to a value not less than 600° C., which causes (light-off) burning of the particulate.

The engine electronic control unit E, allows the correct concentration of oxygen, temperature and flow rate along the exhaust line to be obtained in order to efficiently regenerate the DPF 13, during the regeneration mode.

In particular, by properly calibrating the position of the different actuators on the engine 1, it is possible to cause the correct flow rate for each engine operating condition 1 to flow through the exhaust line.

The residual oxygen flow rate in the exhaust gases can depend, on the other hand, on both the air flow through the engine and the arrangement during the combustion cycle of the fuel injections.

In general, the temperature of exhaust gases entering the filter 13 is controlled by means of post-injections: the engine electronic control unit E doses the quantity of the post-injections to ensure a filter inlet temperature equal to a desired value, defined during calibration. This value, in the order of 600-650° C., allows the triggering of spontaneous oxidation of the particulate stored in the filter 13.

The engine electronic control unit E can activate the regeneration mode when, based on models implemented in the same control unit E, a particulate accumulation level in the filter 13 is estimated, for example, to be equal to a threshold value (100% accumulation), established by the manufacturer depending on the type and volume of the mounted filter 13.

Note that, according to the state of the art, the regeneration parameters described above are calibrated by the manufacturer so that, at a 100% accumulation level, there is a regenerative process that is efficient without exceeding, at the same time, the temperature limit tolerable by the filter 13.

Technical Problem

As mentioned above, the regenerative process is more efficient at high temperatures and high oxygen percentages in the exhaust gases, and at high levels of particulate accumulation inside the filter. However, these efficiency conditions can generate particulate combustion that is too fast in some cases, resulting in rapid elevation of the temperatures within the filter 13, potentially beyond the resistance limit.

Thus, according to the prior art, the regenerative process is calibrated at the expense of the efficiency in order to protect the component and to control the particulate combustion. In particular, the anti-particulate trap is regenerated at low particulate filter filling values (lower or equal to a threshold determined by the manufacturer, 100% filter filling), while maintaining the desired temperature of the gases entering the filter 13 at a non-excessive value. This compromise results in a high frequency and duration of the regenerations and, consequently, higher fuel consumption and a faster deterioration of the engine oil.

A further disadvantage can be seen in the case of driving profiles characterized by extremely short average runs, in which complete regeneration processes cannot be carried out. In these conditions, it is possible that the particulate mass accumulated in the filter 13 exceeds the limits fixed by the manufacturer and that, as a result, the temperature and thermal gradient limits are exceeded, with possible failure of the filter 13 due to thermal shock or fusion of the ceramic substrate.

It is also underlined that, according to the state of the art, the desired temperature value of exhaust gases entering the DPF remains constant throughout the regeneration step. A disadvantage, therefore, can be due to the fact that since there is a progressive reduction of the particulate mass in the filter 13 during the regenerative process, the combustion rate tends to gradually decrease if the exhaust gas temperature is not progressively increased. This results in longer regeneration times than those required if the temperature was controlled during the regeneration step.

Therefore, it can be seen that the common cause of the three problems highlighted above is to be found in the parameters of the regeneration (i.e. flow rate, temperature and oxygen concentration of inlet exhaust gases), which are not configured to the actual value of the particulate mass present in the filter 13. Conversely, the regenerative process is calibrated by the manufacturer so it is only optimal at a level of accumulation around the limit set by the manufacturer, that is, 100% filling. In cases in which filling of the filter exceeds the 100% value envisaged by the manufacture, i.e. in the case of filter clogging (for example, reaching a filter filling level three times above the manufacturer's limit, 300% filling), there is a risk of damage due to combustion that is too rapid, while for accumulation levels lower than 100% there is a longer than necessary regeneration time because of combustion that is too slow. This results in a high frequency and duration of the regenerations, resulting in a waste of fuel and a faster deterioration of the engine oil quality.

Object of the Invention

The object of the present invention, with reference to the field of Diesel-type combustion engines, is to provide a method and a system for controlling the combustion of particulate present in a particulate filter (DPF), so as to overcome the disadvantages discussed above, for example, avoiding combustion that is too fast, which can break the filter due to thermal shock or fusion of the ceramic matrix.

Another object of the present invention is to allow safe regeneration even if the particulate mass values are greater than a limit set by the manufacturer (filter clogging), thus reducing the regeneration frequencies, the degradation of the lubricating oil and the fuel consumption.

SUMMARY OF THE INVENTION

In order to achieve the aforesaid objects, the invention relates to a method for controlling a Diesel engine system, of the type comprising a particulate filter located in the engine exhaust line, and an electronic engine control unit of the engine for controlling a plurality of fuel injectors associated with the cylinders of the engine, in which a regeneration mode is activated—when a particulate mass accumulated in the filter reaches a predetermined threshold mass—comprising activating post-injections of fuel by controlling the plurality of injectors, with the regeneration mode that causes the start of a step of automatic regeneration of the filter by an increase in the temperature of the exhaust gases sent to the filter, sufficient to burn the particulate in the filter. The method of the present invention is characterized in that it comprises:

receiving a value of the accumulated particulate mass and a temperature value upstream of the filter and, optionally, a temperature value downstream of the filter, activating an overheating mode, including at least interrupting the post-injection of fuel, to block and possibly cancel the accumulated particulate mass oxidation whenever a critical condition occurs, for at least a first period of time where the critical condition is detected when the temperature upstream of the filter exceeds a first threshold value, and resuming the regeneration mode following the disappearance of the critical condition.

The invention also relates to a system as well as a computer-program product that can be loaded into the memory of at least one processing module (e.g., an electronic control unit of the engine) and including software code portions to carry out the steps of the method when the product is executed on at least one processing module. As used herein, the reference to such a computer-program product is intended to be equivalent to referring to means readable by an electronic control unit of the engine or by a computer, containing instructions for controlling the processing system in order to coordinate the implementation of the method according to one or more embodiments. The reference to "at least one processing module" is intended to highlight the possibility of implementing one or more embodiments in a modular and/or distributed form.

DESCRIPTION OF THE FIGURES

Further characteristics and advantages of the invention will become apparent from the description that follows with reference to the attached drawings, provided purely by way of non-limiting example, wherein.

DESCRIPTION OF AN EMBODIMENT

Figure 1:
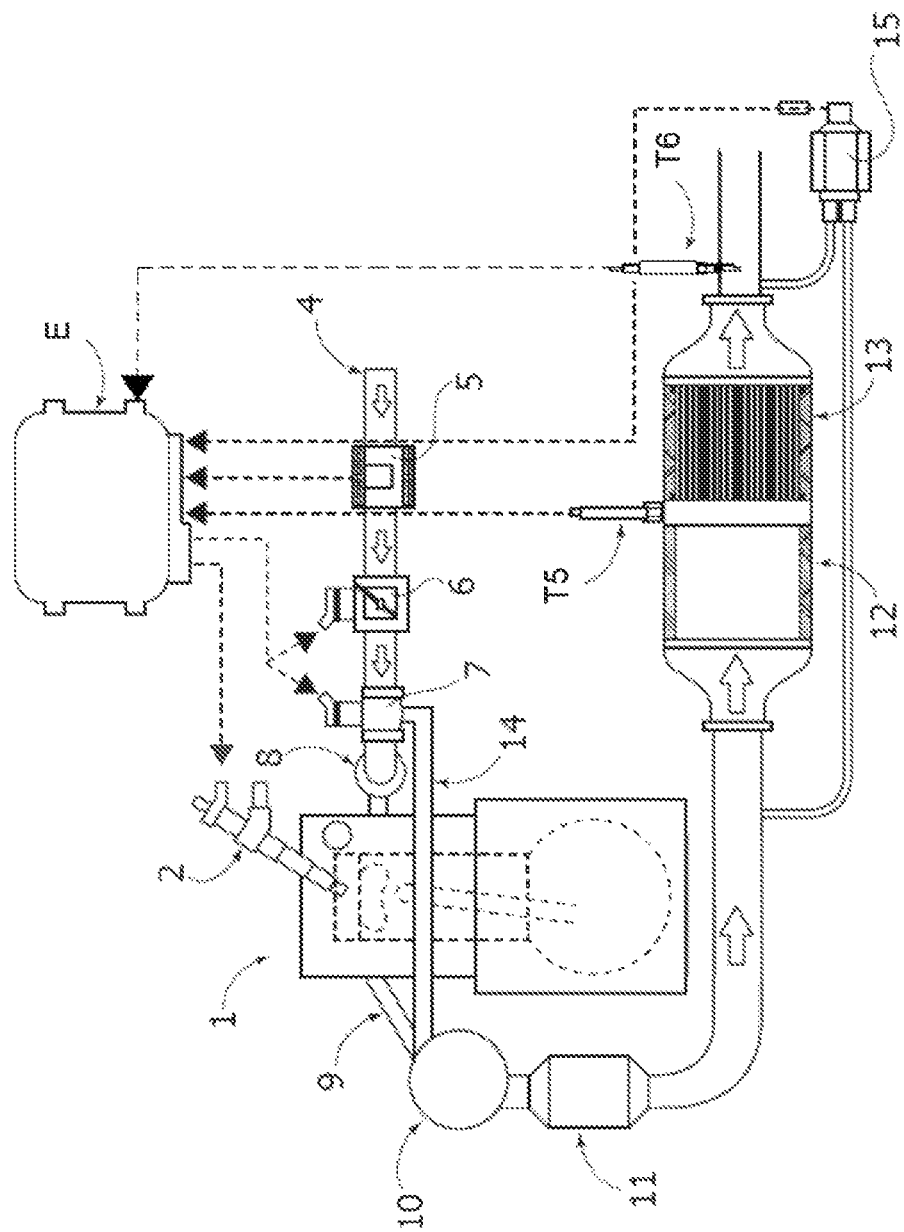
FIG. 1, already described above, schematically illustrates a Diesel engine, of the type to which the present invention is applied.

The basic idea of the present invention is to control the regeneration steps of the particulate filter, intervening both on their frequency and their duration. In general, control is desired, during each individual regenerative process, of the particulate combustion rate in the DPF 13. In this way, if a particulate mass accumulated in the filter 13 is greater than an expected value (for example, the value set by the manufacturer of 100% filter filling), it is possible to preserve the integrity of the particulate filter, while, if a particulate mass accumulated in the filter 13 is less than the expected value, it is possible to increase the regeneration efficiency of the filter 13.

It is possible to change the rapidity of combustion during the regeneration step by varying the oxygen concentration, flow rate and temperature of the exhaust gases during the regeneration steps.

In particular, the present invention allows control of the particulate oxidation phenomenon by means of two different methodologies, which can operate in combination with each other.

The first method, called open-loop, acts in advance on the desired temperature of the gas entering the DPF filter 13, which changes over time, moment by moment, depending on the accumulation level of the filter 13. In particular, the desired value is reduced if the estimated particulate mass is too high, for example, filling the filter above the limit set by the manufacturer, of 100%, which could potentially generate temperature peaks beyond the limit set by the manufacturer. Instead, the desired temperature value is gradually increased during the regeneration step, since the residual particulate mass in the filter 13 is progressively reduced to maintain the rapidity of oxidation and reduce the time it takes to completely burn the particulate.

It will be appreciated that, in the case in which it is not possible to measure the particulate mass stored in the filter 13 (by means of on-board sensors installed in the engine), it is possible to calculate the accumulated particulate mass according to a flow resistance, used as an indicator. This parameter is calculated as the ratio between a pressure drop downstream compared to upstream of the filter 13 and a volumetric flow rate of exhaust gases crossing the filter 13 itself. Both of these physical parameters are measurable by sensors conventionally installed on the engines such as the sensor 15, for example, a differential pressure sensor and/or a flow meter. Since the resistance in flow is dependent on the quantity of particulate present in the filter, it can be used as an indicator of the clogging status of the filter itself.

In general, the first described control methodology, that is, the open-loop methodology, should be sufficient to avoid temperature peaks in the filter 13. However, in the case that critical conditions occur, or rather inlet or outlet temperatures at the filter 13 are too high, the present invention enables the second control method to be activated, known as the closed-loop method.

This second methodology also allows instantaneous interruption of the regeneration mode if the upstream and/or downstream temperatures of the filter are too high, i.e. if they exceed a threshold value, as opposed to the open-loop method, which keeps these values under control. Interruption of the particulate combustion in the filter 13 can be accomplished by introducing a specially calibrated engine control mode for this purpose, called overheating mode.

When a condition for deactivating the overheating mode occurs, when the critical conditions are no longer verified, the engine control unit E again activates the regeneration mode of the particulate filter 13, in order to burn the residual particulate mass by means of controlling the post-injections of fuel.

It will be appreciated that the overheating operating mode may be desired by the engine control unit E whenever critical conditions occur and, therefore, even more than once during a single regeneration step. In other words, there is a possibility that the critical conditions occur more than once during the same regeneration step, and the regeneration mode and overheating mode can alternate.

During the overheating mode, to interrupt the particulate oxidation, post-injections of fuel are deactivated, so as to suddenly reduce the inlet exhaust gas temperatures into the particulate filter 13 and lower them below the temperature value that allows spontaneous combustion of the particulate (for example, about 600-650° C. in the case of platinum-catalyzed filters).

In addition, further actions can be taken to stop the particulate oxidation, in case deactivation of post-injections of fuel is insufficient. In fact, because of the thermal inertia of the ceramic matrix, high temperature conditions could be maintained within the filter 13 for a time sufficient to cause uncontrolled combustion of the particulate.

For this reason, during the overheating mode, in addition to deactivating post-injections of fuel, it is also possible to act on the flow rate and oxygen concentration of the exhaust gases.

In particular, it would be desirable to increase the exhaust gas flow rate through the filter 13, by reducing the inlet and outlet temperature, and reducing the temperature peaks due to uncontrolled combustion. It would also be desirable to reduce, at the same time, the residual oxygen percentage in the exhaust gases, so as to limit the value of the oxidizable particulate mass.

Unfortunately, these two actions cannot occur simultaneously, as the increase in the flow rate of exhaust gases inevitably results in an increase in residual oxygen in the exhaust gases and vice versa. Therefore, during the overheating mode, it is possible to favor an increase in the flow rate of exhaust gases or a reduction in the percentage of oxygen in the exhaust gases, for example, depending on the operating point of the engine.

Figure 2:
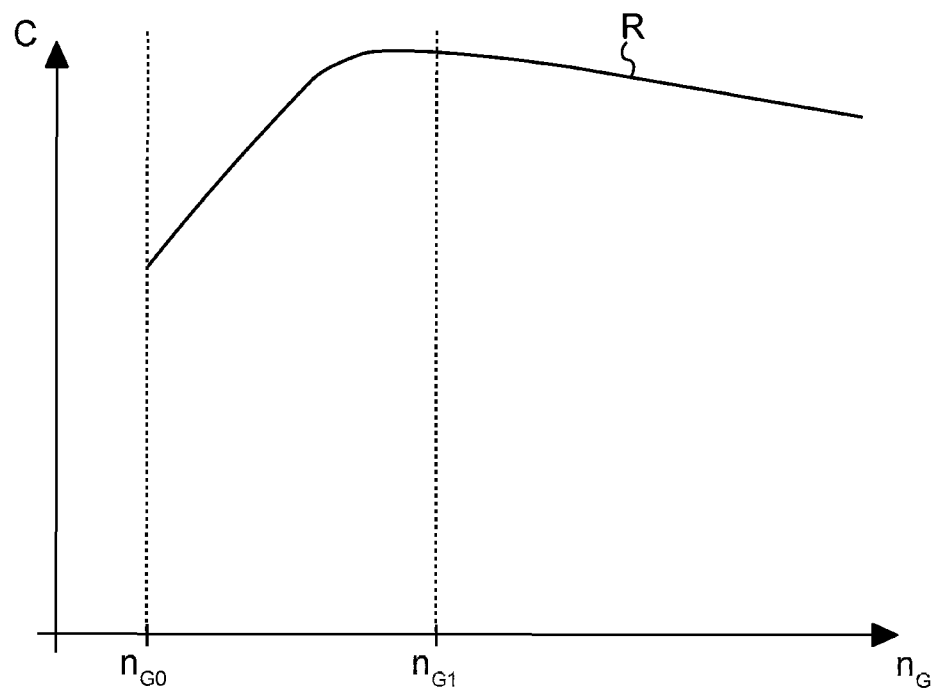
FIG. 2 is an example of possible actions to interrupt the particulate oxidation according to the present invention, depending on the operating point of the engine.

FIG. 2 illustrates a full load curve R, represented as a function of the engine revolution number $n_G$ and the engine torque C. This representation facilitates comprehension of what actions are taken to stop oxidation of the particulate depending on the operating point of the engine.

In particular, if the engine is operating at medium-high rotation speeds, i.e. a number of rotations higher than $n_{G1}$ (e.g. about 1500 rpm), the flow of exhaust gases can be increased at the expense of residual oxygen reduction: under these conditions it is possible to obtain a sufficient gas flow to rapidly reduce the temperatures in the filter 13 and to avoid uncontrolled combustion of particulate mass.

Conversely, if the engine operates at low rotation speeds, e.g. a number of rotations lower than the value $n_{G1}$, the residual oxygen percentage can be reduced: in these conditions, it is not possible to request the engine to have a high flow rate of exhaust gases and, therefore, as it is difficult to rapidly reduce the internal temperatures of the filter 13, it may limit the particulate combustion rate. In fact, the mass of particulate that can be burned increases as the flow rate of oxygen increases through the filter 13 itself: therefore, by reducing the oxygen flow rate, to cancel it, the particulate combustion can be reduced (or interrupted if there is no oxygen flow). It can be appreciated that the values previously presented as the limit between the low and medium-high speeds are to be considered purely by way of example: in fact, they are used here as an arbitrary limit between rotation speeds, for simplicity and brevity, but there is no defined boundary, and switching from one to another mode is achieved by calibration of several engine parameters that are constantly changing.

Consequently, in addition to interrupting the post-injections, if the engine is running at medium or high speed, it is possible to increase the exhaust gas flow rate while, if the engine is running at a low speed, it is possible to reduce the residual oxygen percentage in the exhaust gases.

In addition, it has been found that adjusting the concentration of oxygen to low values is difficult, and can result in high instability in the combustion chamber, particularly when the engine is at low rotation speeds, for example, a number of rotations lower than $n_{G0}$, less than 900 rpm. The method of the present invention aims to increase the engine rotation speed above a lower limit, in the event that the overheating mode is activated. In this way, the overheating mode can only be activated if the rotation speed is higher than the lower limit (for example, the number of rotations exceeds the value neo), and it is possible to avoid operating the engine in conditions where the combustion process in the chamber would be unstable at low oxygen values.

As mentioned above, the overheating operating mode is requested by the engine control unit in the case that critical conditions are detected for the particulate filter 13, temporarily suspending the regenerative mode of operation, at least until the critical conditions cease to be detected.

Figure 3:
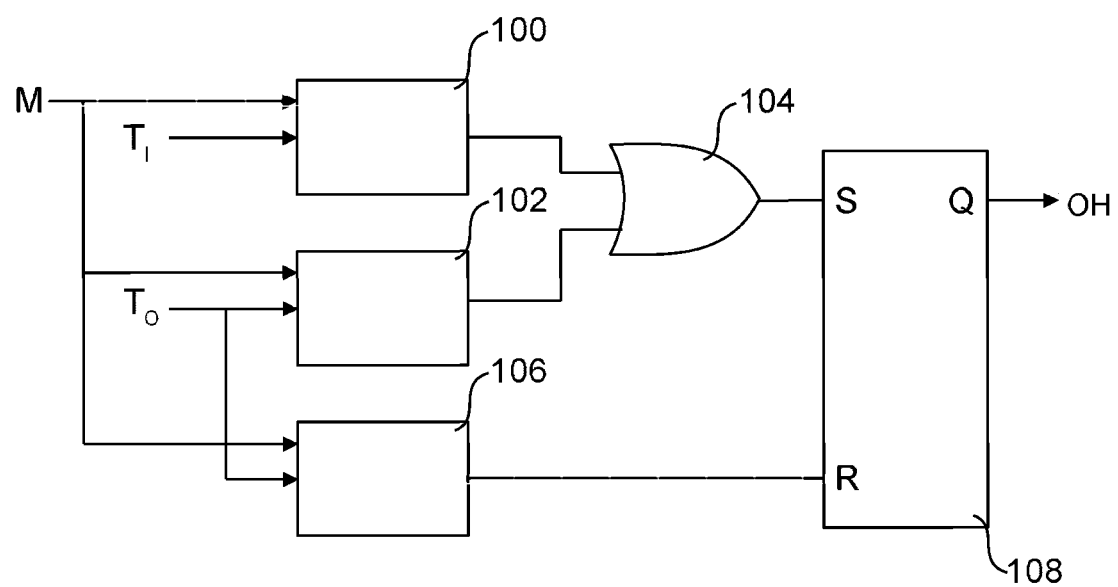
FIG. 3 is a block diagram showing the logic on which the electronic control unit is based in the case of the present invention.

In FIG. 3, the logic behind the second closed-loop control method described above is concisely shown, in particular, the logic of entering and leaving the overheating mode, represented by an OH signal with a high value (e.g. 1) in the case of activating and a low value (e.g. 0), in the case of deactivating the overheating mode.

A block 100 receives, as inputs, an inlet temperature $T_I$ and an accumulated particulate mass M, and returns a signal indicative of the fact that a first critical activation condition has been detected. In a non-limiting example, this signal is 1 if the first activation condition is present, and is otherwise 0. This first critical condition occurs if the temperature value of the gases entering the filter $T_I$ exceeds a first threshold value for a first critical time period, both values being calibrated. In particular, both the threshold value for the temperature $T_I$ entering the filter and the critical time are calibrated according to the particulate mass M stored in the filter (that is, the value eventually calculated by means of the sensors present on the filter, as described above). Therefore, when the stored particulate mass M decreases (thanks to the progression of the regeneration step), the value of the first critical temperature threshold and the value of the first critical time period of permanence in this condition increase.

Activating the overheating mode, following detection of the first activation condition, does not involve an uncontrolled combustion of particulate, since the first activation condition is a preventative condition that triggers oxidation reactions, but interrupts them after a certain critical time, to prevent them from becoming too rapid and generating temperature peaks in the gases entering and leaving the particulate filter 13.

Therefore, in a block 102, a second critical activation condition can be detected, depending on the temperature of the gases leaving the filter $T_O$ and the accumulated particulate mass M in the filter 13. This second activation condition occurs when the temperature of the exhaust gases leaving the filter $T_O$ exceeds a second threshold value for a second period of time, both of these values are calculated as a function of the mass of stored particulate M: once again, when the accumulated particulate mass M decreases, the value of the second threshold temperature and the second time period for which critical conditions are detected can be increased.

The signal leaving the block 102 is thus representative of the occurrence of an oxidation that is too rapid, detected by means of the second critical activation condition, since the temperature increase $T_O$ leaving the particulate filter is due to the particulate combustion inside the filter itself.

The second critical condition can be used as a safety condition, if the first condition was insufficient. In fact, the temperature $T_O$ of the exhaust gases leaving the filter is indicative of the effective rapidity of combustion of the particulate, but due to the thermal inertia of the filter 13, this information can be obtained with a high delay, which can lead to not being able to safeguard the component effectively.

Generally, the two conditions are evaluated in parallel, by means of an OR 104 logic gate, which receives the signals leaving the blocks 100 and 102, so that the overheating mode can be requested and activated when at least one of the two critical activation conditions occurs.

As mentioned earlier, the regeneration mode can be reactivated again if the critical activation conditions are no longer detected and a return condition occurs. This return state can be calculated, in a block 106, as a function of the temperature of the gases leaving the filter $T_O$, received at the input of the block 106, together with the accumulated particulate mass M. For example, when the value of the outlet temperature derivative $T_O$ becomes less than or equal to zero and, at the same time, the value of this temperature is below a certain threshold for a certain period of validation time, the return condition is validated and—at the output of the block 106—a signal indicative of a request for interrupting the overheating mode will be present, for example, having a high value in the case of request for interrupting the overheating mode, and low otherwise. The return condition indicates that particulate combustion no longer occurs in the filter 13 and, therefore, the return condition causes the regeneration mode to reactivate. Again, the temperature threshold values and the validation time period are calculated according to the particulate mass M stored in the filter (calculated, in turn, through the values received by the sensors present in the system and particularly on the filter 13): as the stored mass value M decreases, the threshold value for the outlet temperature $T_O$, and for its derivative and the validation time decrease. Conversely, if the accumulated mass M is high, for example, at the start of the regeneration step, these threshold values are higher, in order to allow the reactivation of the regeneration mode if there is relative certainty that the particulate combustion has been interrupted during the overheating mode.

In addition, an output signal at the OR logic gate 104 is taken to a set input S of an SR latch 108, while the signal indicating the deactivation condition at the output of the block 106 is taken to a reset input R of the SR latch 108. At the output Q of the latch 108, a signal is generated requesting activation of the overheating mode OH, which has a high value in the case of activation request (e.g., 1) or low in the case of a deactivation request (e.g., 0) of the overheating mode. Activation and deactivation of the overheating mode can also occur instantly following switching on of the overheating signal OH. Therefore, the overheating mode can be activated if the first and/or the second critical activation condition occur, and can be deactivated if the return condition occurs and, at the same time, both the first critical condition and the second critical condition are absent.

Figure 4A:
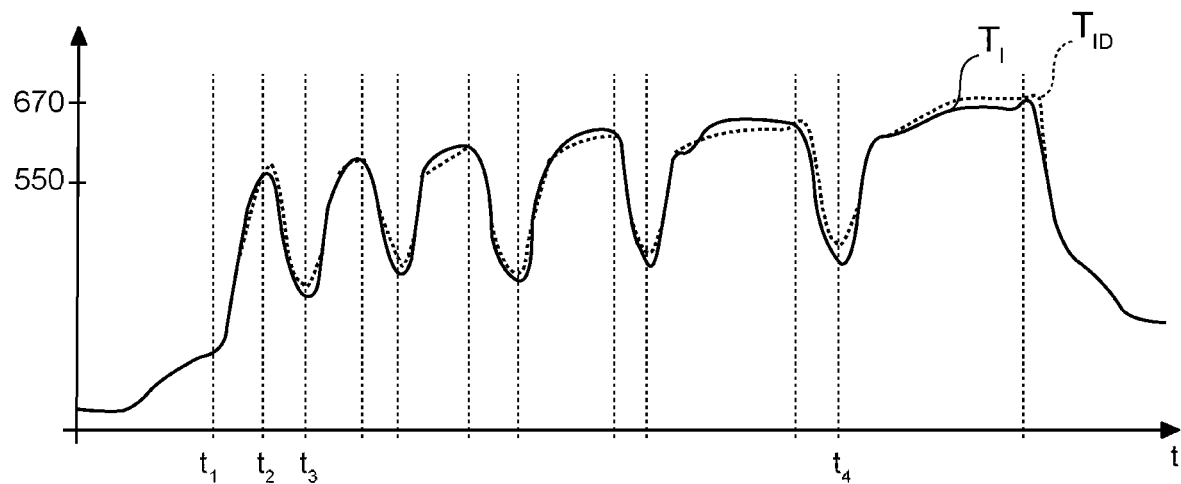
FIGS. 4A to 4E are exemplary of variations in time of magnitudes relative to a particulate filter of a system in which a regeneration control method according to the present invention is present.
Figure 4B:
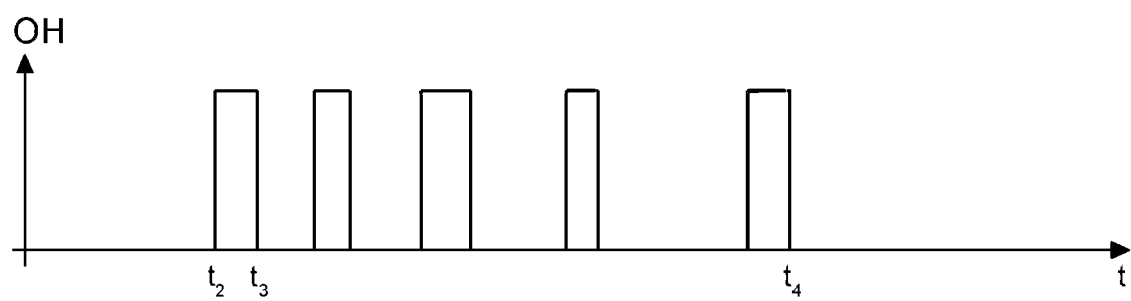
Figure 4C:
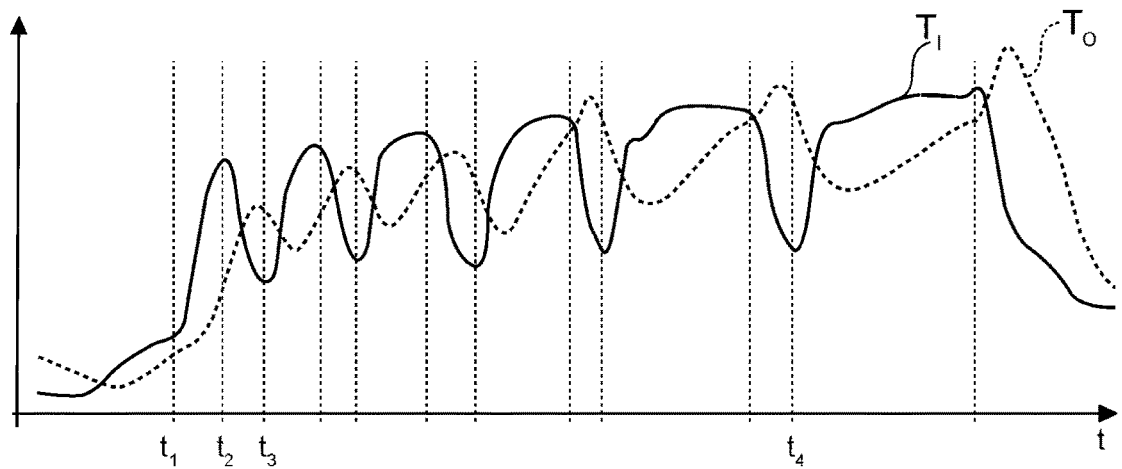
Figure 4D:
Figure 4E:
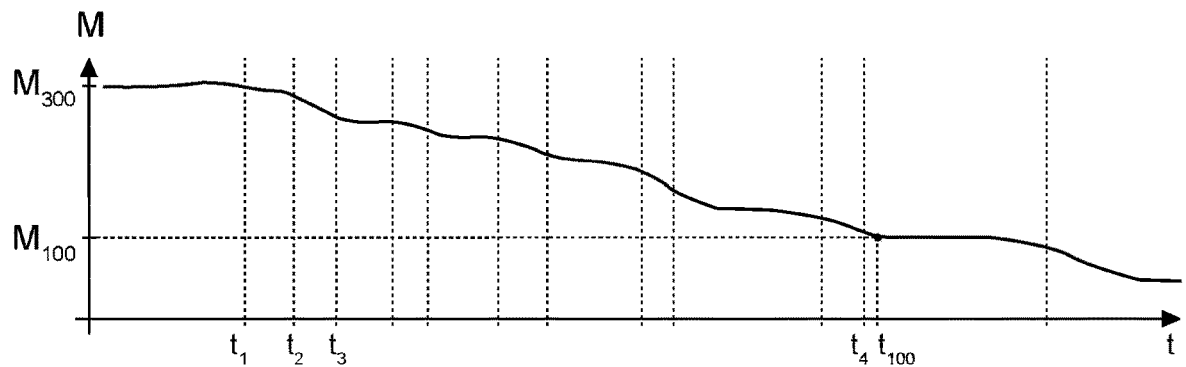

An actual regeneration step is shown in FIGS. 4A-4E in the case in which a method according to one or more embodiments is performed. In particular, FIG. 4A shows the variation in time of a temperature of the gases entering the filter $T_I$ and of a desired inlet temperature $T_{ID}$, which can change as a function of the mass M of accumulated particulate in the filter (calculated using the open-loop method), and which can be used in the block 100 to calculate the first temperature threshold if the first critical condition of the overheating mode is activated; FIG. 4B represents the request signal for activating and deactivating the overheating mode OH; FIG. 4C represents the variation in time of the inlet $T_I$ and outlet $T_O$ temperatures of the filter 13; FIG. 4D represents post-injections PI (in mm³/cc) of fuel as a function of the time; and FIG. 4E represents the quantity of mass of stored particulate M within the filter 13, which decreases over time during the regeneration step.

Thanks to the method described in the description, it was possible to regenerate the particulate filter 13 starting from an accumulated particulate level that was 300%, above the limit set by the manufacturer, $M_{300}$ in FIG. 4E, without exceeding the inlet and outlet temperature threshold values of the filter $T_I$ and $T_O$ set by the manufacturer.

At the start of the regeneration step, at a time $t_1$, when the engine control unit activates the regeneration mode, post-injections of fuel PI are activated to rapidly increase the temperature $T_I$ of the gases entering the filter. However, the desired temperature $T_{ID}$ is maintained low (for example, about 550° C.) to control the rapid combustion of the particulate mass M inside the filter 13. As the particulate mass M is gradually burned, this desired temperature value rises, as described above with reference to FIG. 3.

At a time $t_2$, when one of the first or second critical conditions described above is validated, the engine control unit stops the regeneration mode and activates the overheating operating mode (OH signal passes to its high value): the post-injections are deactivated as shown in FIG. 4D, possibly changing the gas flow rate or oxygen concentration at the same time.

Consequently, the inlet temperature $T_I$ drops rapidly and the particulate combustion is reduced until it stops.

When, at a time $t_3$, the outlet temperature $T_O$ reaches its peak and begins to decrease (that is, its derivative is zero or negative), the deactivation condition is detected and allows the overheating mode to stop and the regeneration mode to reactivate. It will be appreciated that the outlet temperature $T_O$ reaches its local peak following the inlet temperature $T_I$ due to the thermal inertia previously discussed, and the burned particulate mass will also be reduced and brought to zero with a delay compared to the time in which the overheating mode begins, as can be seen in FIG. 4E where the stored particulate mass M becomes constant around a time $t_3$ in which the overheating mode is deactivated. At this time, the accumulated mass M in the particulate filter 13 is, therefore, lower than that at time $t_1$. Consequently, the desired temperature $T_{ID}$ can be greater than the desired temperature $T_{ID}$ at time $t_1$, since the desired temperature $T_{ID}$ increases as the accumulated mass M in the filter decreases given that, as the accumulated mass M decreases, the occurrence of temperature peaks is less likely. In other words, the desired inlet temperature of the filter $T_{ID}$ is gradually increased, and the threshold values for recognition of the critical conditions, for example, the threshold temperature value and the permanence time in this condition, become higher.

The regeneration and overheating operating modes alternate during the regeneration step, and the accepted temperatures increase progressively: the inlet and outlet temperatures can increase if there is a simultaneous decrease in the accumulated mass M in the filter.

It will be appreciated that at a moment $t_4$, a last overheating operating mode of the regeneration step is deactivated. This is because at a time called two, the particulate mass reaches the accumulation level established by the manufacturer $M_{100}$, that is filling of the filter by 100%. Below this value of the accumulated mass $M_{100}$, the regeneration step can proceed spontaneously until complete oxidation of the particulate occurs, since the inlet and outlet temperatures of the filter $T_I$ and $T_O$ have difficulty in exceeding a temperature value beyond which there is a risk of uncontrolled combustion. From time two, the desired inlet temperature value at the filter $T_{ID}$ can be further increased (to about 670° C.) to maintain a high regeneration efficiency. Therefore, once the accumulated particulate mass reaches 100% filling $M_{100}$ dictated by the manufacturer, the overheating mode will no longer be activated in this operating example.

It will be appreciated that, at a 100% filter filling level, the thresholds of the first and second critical activation conditions and their respective critical times become high, so it is uncommon to activate the overheating mode below this level of mass $M_{100}$, representing 100% filling of the filter.

In different embodiments, the overheating mode can, in any case, be activated during the entire regeneration step, and thus also at this 100% accumulation level; in fact, in particular driving conditions (e.g. in urban driving with low flow rate values of exhaust gases), temperature peaks may also occur at very low values of stored mass M in the filter, that is, below the 100% filling level provided by the manufacturer.

In conclusion, the present invention avoids uncontrolled particulate combustion in the filter 13 so as to reduce the probability that the temperature limit set by the manufacturer is exceeded, thus preserving the integrity of the filter itself.

The present invention also allows an increase in the limit of accumulated mass within the particulate filter dictated by the manufacturer (100% filling of the filter), allowing filter clogging (300% accumulation level) without, however, increasing the risk of damage to the filter 13. As a result, it is possible to perform more effective regeneration steps less frequently, resulting in reduced fuel consumption and less degradation of lubricating oil.

Without prejudice to the underlying principles, the details and the embodiments may vary, even appreciably, with respect to what has been described here, purely by way of example, without departing from the scope of protection.

This field of protection is defined by the attached claims.

The invention claimed is:

1. A method for controlling a diesel engine system, said system including a diesel engine, an exhaust line for exhaust gases from the engine, a particulate filter interposed in the exhaust line and an electronic control unit for controlling a plurality of fuel injectors associated with cylinders of the engine, wherein when an accumulated particulate mass in said filter reaches a predetermined threshold amount, a filter regeneration mode is activated, including activating post-injections of fuel by controlling said plurality of injectors, which determines a start of an automatic filter regeneration step, which is caused by an increase in temperature of the exhaust gases fed to the filter, where said increase in temperature is sufficient to burn particulate present in the filter, said method comprising:
  receiving a value of said accumulated particulate mass and a temperature value upstream of the filter, activating an overheating mode that is configured for interrupting particulate combustion, said overheating mode including deactivating said post-injections of fuel, whenever a critical condition occurs for at least a first period of time, said critical condition being a condition wherein said temperature value upstream of the filter exceeds a first threshold value, and resuming said regeneration mode following a disappearance of said critical condition, wherein said first threshold value and said first time period are calculated as a function of the accumulated particulate mass in the filter, wherein said calculated first threshold value and said first period of time increase in time as the particulate mass accumulated in the filter decreases.

2. The method according to claim 1, comprising the following steps:

receiving a temperature value downstream of the filter, activating said overheating mode whenever said critical condition and/or a further critical condition occurs, said further critical condition being said temperature value downstream of the filter exceeds a second threshold value for a second period of time, and resuming said regeneration mode following disappearance of said critical condition and said further critical condition.

3. The method according to claim 2, wherein said first second threshold values and said second time periods are calculated as a function of the particulate mass accumulated in the filter.

4. The method according to claim 3, wherein said calculated second threshold values and said calculated second time period increase in time as the particulate mass accumulated in the filter decreases.

5. The method according to claim 1, wherein the accumulated particulate mass is calculated as a function of a resistance in flow through the filter, calculated as a ratio between a pressure drop downstream of the filter compared to upstream, and a volumetric flow rate of exhaust gases through the filter.

6. The method according to claim 1, wherein activating said overheating mode comprises interrupting said post-injections of fuel and:

if the engine is running at least at a medium speed, increasing a flow rate of exhaust gases, or if the engine is running at a low speed less than the medium speed, reducing a percentage of residual oxygen in the exhaust gases.

7. The method according to claim 1, comprising:

allowing activation of said overheating mode if an engine rotation speed is greater than a predetermined minimum value, and if said rotation speed is lower than said predetermined minimum value, adjusting said rotation speed to exceed said predetermined minimum value before activating said overheating mode.

8. The method according to claim 6, comprising, after the interruption, restarting said regeneration mode when a return condition occurs, said return condition including:

a value of a derivative of a temperature downstream of the filter is negative or zero, and a value of the temperature downstream of the filter is less than a third threshold value for a third time period.

9. The method according to claim 8, wherein said third threshold value and said third time period are calculated as a function of the particulate mass accumulated in the filter.

10. The method according to claim 9, wherein said third threshold value and said third time period increase over time as the particulate mass accumulated in the filter increases.

11. A diesel engine system for a motor-vehicle, said system comprising a diesel engine, an exhaust line for exhaust gases from the engine, a particulate filter interposed in the engine exhaust line, and an electronic control unit for controlling fuel injectors associated with cylinders of the diesel engine, wherein when an accumulated particulate mass in said filter reaches a predetermined threshold amount, a filter regeneration mode is activated, including activating post-injections of fuel by controlling said plurality of injectors, which determines a start of an automatic filter regeneration step, which is caused by an increase in temperature of the exhaust gases fed to the filter, where said increase in temperature is sufficient to burn particulate present in the filter, said electronic control unit configured for:

receiving a value of said accumulated particulate mass and a temperature value upstream of the filter, activating an overheating mode that is configured for interrupting particulate combustion, said overheating mode including deactivating said post-injections of fuel, whenever a critical condition occurs for at least a first period of time, said critical condition being a condition wherein said temperature value upstream of the filter exceeds a first threshold value, and resuming said regeneration mode following a disappearance of said critical condition, wherein said first threshold value and said first time period are calculated as a function of the accumulated particulate mass in the filter, wherein said calculated first threshold value and said first period of time increase in time as the particulate mass accumulated in the filter decreases.

12. A non-transitory computer-readable storage medium having instructions stored thereon, which, when executed by one or more processing modules, cause the one or more processing modules to perform operations comprising performing a method for controlling a diesel engine system, said system including a diesel engine, an exhaust line for exhaust gases from the engine, a particulate filter interposed in the exhaust line and an electronic control unit for controlling a plurality of fuel injectors associated with cylinders of the engine, wherein when an accumulated particulate mass in said filter reaches a predetermined threshold amount, a filter regeneration mode is activated, including activating post-injections of fuel by controlling said plurality of injectors, which determines a start of an automatic filter regeneration step, which is caused by an increase in temperature of the exhaust gases fed to the filter, where said increase in temperature is sufficient to burn particulate present in the filter, said method comprising:

receiving a value of said accumulated particulate mass and a temperature value upstream of the filter, activating an overheating mode that is configured for interrupting particulate combustion, said overheating mode including deactivating said post-injections of fuel, whenever a critical condition occurs for at least a first period of time, said critical condition being a condition wherein said temperature value upstream of the filter exceeds a first threshold value, and resuming said regeneration mode following a disappearance of said critical condition, wherein said first threshold value and said first time period are calculated as a function of the accumulated particulate mass in the filter, wherein said calculated first threshold value and said first period of time increase in time as the particulate mass accumulated in the filter decreases.

\* \* \* \* \*